(12) United States Patent
Yuan et al.

(10) Patent No.: US 12,187,533 B2
(45) Date of Patent: Jan. 7, 2025

(54) CONTAINER LINER FOR HOLDING LIQUIDS

(71) Applicant: SABIC GLOBAL TECHNOLOGIES B.V., Bergen op Zoom (NL)

(72) Inventors: Li Yuan, Geleen (NL); Jianfeng Huang, Geleen (NL); Bart Van Den Esschert, Geleen (NL); Shengming Cui, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 413 days.

(21) Appl. No.: 17/619,438

(22) PCT Filed: Jun. 9, 2020

(86) PCT No.: PCT/EP2020/065891
§ 371 (c)(1),
(2) Date: Dec. 15, 2021

(87) PCT Pub. No.: WO2020/254139
PCT Pub. Date: Dec. 24, 2020

(65) Prior Publication Data
US 2022/0306378 A1   Sep. 29, 2022

(30) Foreign Application Priority Data
Jun. 20, 2019  (EP) .................................... 19181453

(51) Int. Cl.
*B65D 90/04*    (2006.01)
*B32B 1/00*     (2006.01)
*B32B 27/08*    (2006.01)
*B32B 27/32*    (2006.01)
*C08J 5/18*     (2006.01)
*C08L 23/08*    (2006.01)

(52) U.S. Cl.
CPC .............. *B65D 90/046* (2013.01); *B32B 1/00* (2013.01); *B32B 27/08* (2013.01); *B32B 27/32* (2013.01); *B32B 27/327* (2013.01); *C08J 5/18* (2013.01); *C08L 23/0815* (2013.01); *B32B 2250/03* (2013.01); *B32B 2250/242* (2013.01); *B32B 2270/00* (2013.01); *B32B 2307/30* (2013.01); *B32B 2307/54* (2013.01); *B32B 2307/558* (2013.01); *B32B 2307/581* (2013.01); *B32B 2307/72* (2013.01); *B32B 2307/732* (2013.01); *B32B 2439/40* (2013.01); *B32B 2439/70* (2013.01); *C08J 2323/06* (2013.01); *C08L 2203/16* (2013.01); *C08L 2205/02* (2013.01)

(58) Field of Classification Search
CPC ......... B65D 90/046; B32B 1/00; B32B 27/08; B32B 27/32; B32B 27/327; B32B 2250/03; B32B 2250/242; B32B 2270/00; B32B 2307/30; B32B 2307/54; B32B 2307/558; B32B 2307/581; B32B 2307/72; B32B 2307/732; B32B 2439/40; B32B 2439/70; C08J 5/18; C08J 2323/06; C08L 23/0815; C08L 2203/16; C08L 2205/02
USPC .......................................................... 426/106
See application file for complete search history.

(56) References Cited

U.S. PATENT DOCUMENTS

| 6,162,871 A | 12/2000 | Watanabe et al. |
| 6,270,819 B1 | 8/2001 | Wiese |
| 6,492,010 B1 | 12/2002 | Karaoglu et al. |
| 11,352,456 B2 | 6/2022 | Gerrits et al. |
| 2004/0131806 A1* | 7/2004 | Barmore ................. B32B 27/36 428/34.2 |

(Continued)

FOREIGN PATENT DOCUMENTS

| EP | 3753732 A1 * | 12/2020 | ............... B32B 1/00 |
| JP | 3672394 B2 | 4/2005 | |
| JP | 2006508872 A * | 3/2006 | |
| WO | 03059599 A1 | 7/2003 | |
| WO | 2011004001 A1 | 1/2011 | |
| WO | 2018096480 A1 | 5/2018 | |
| WO | 2018113455 A1 | 6/2018 | |
| WO | 2019207172 A1 | 10/2019 | |
| WO | 2020064349 A1 | 4/2020 | |

OTHER PUBLICATIONS

Translation of JP-2006508872-A (Year: 2016).*

(Continued)

*Primary Examiner* — Brent T O'Hern
(74) *Attorney, Agent, or Firm* — CANTOR COLBURN LLP

(57) ABSTRACT

The present invention relates to a container liner for holding liquid goods, wherein the liner comprises a film comprising one or more layers, wherein at least one of said layers is a layer L1 comprising (a) ≥20.0 wt %, preferably ≥20.0 and ≤80.0 wt %, with regard to the total weight of that layer L1, of a polyethylene P1 having: •a density of >900 and <915 kg/m³, preferably of >905 and <913 kg/m³ as determined in accordance with ASTM D1505 (2010); •a melt mass flow rate of ≥0.1 and ≤5.0 g/10 min, preferably of ≥0.5 and ≤2.0 g/10 min, as determined in accordance with ISO 1133-1 (2011) at 190° C. using a load of 2.16 kg; and (b) ≥20.0 wt %, preferably ≥20.0 and ≤80.0 wt %, with regard to the total weight of that layer L1, of a polyethylene plastomer P2 having: •a density of >880 and <905 kg/m³, preferably of >890 and <904 kg/m³ as determined in accordance with ASTM D1505 (2010); •a melt mass flow rate of ≥0.1 and ≤5.0 g/10 min, preferably of ≥0.5 and ≤2.0 g/10 min, as determined in accordance with ISO 1133-1 (2011) at 190° C. using a load of 2.16 kg. Such container liner demonstrates a desirably high flex resistance, combined with a high dart impact resistance, and a high tensile strength.

16 Claims, No Drawings

(56) References Cited

U.S. PATENT DOCUMENTS

| | | |
|---|---|---|
| 2007/0117946 A1 | 5/2007 | Schwab et al. |
| 2017/0297312 A1 | 10/2017 | Oyama |
| 2018/0201705 A1 | 7/2018 | Desportes et al. |
| 2018/0272672 A1 | 9/2018 | Ambroise |
| 2022/0001588 A1 | 1/2022 | Fan et al. |
| 2022/0064389 A1 | 3/2022 | Garg et al. |
| 2022/0080703 A1 | 3/2022 | Gerrits et al. |

OTHER PUBLICATIONS

International Search Report for International Application PCT/EP2020/065891, International Filing Date Jun. 9, 2020, Date of Mailing Sep. 17, 2020, 4 pages.

Written Opinion for International Application PCT/EP2020/065891, International Filing Date Jun. 9, 2020, Date of Mailing Sep. 17, 2020, 5 pages.

\* cited by examiner

CONTAINER LINER FOR HOLDING LIQUIDS

CROSS REFERENCE TO RELATED APPLICATIONS

This application is a National Stage application of PCT/EP2020/065891, filed Jun. 9, 2020, which claims the benefit of European Application No. 19181453.2, filed Jun. 20, 2019, both of which are incorporated by reference in their entirety herein.

The present invention relates to container liner for holding liquids, wherein the container liner comprises a film that comprises polyethylene materials.

In the field of transportation of goods, there is an ongoing driver to strive for improvement of efficiency throughout the transportation process. This quest for efficiency improvement is amongst others driven by ever more stringent transportation cost requirements. An improvement in efficiency typically results in reduction of costs of transportation, as well as an increase in flexibility, and a reduction of loss of goods.

A particular manner in which efficiency improvement is pursued is by using of standardised units for transporting goods. Such transportation units, which are well known as intermodal containers or shipping containers, have such standardised dimensions and design that it is possible to transport them using a large variety of transportation means, including ships, trucks and trains, without having to make any adjustment to the transportation means to allow safe and secure fitting of the containers onto the transportation means. That is, the containers are of such dimensions that a given truck, train or ship, designed for intermodal container transportation, can take on the vast majority of available containers. This makes is easy and efficient to transport goods, which only have to be loaded into a container once and then can be transported using several transportation means. By so, goods can be transported from one place to the other with minimised handling.

Typically, the intermodal containers are so-called 'dry freight' containers, in the form of a box-type container with doors at one end, and corrugated steel walls. Whilst being perfectly suitable for holding many types of dry freight, they cannot be used per se for transporting liquid goods, since they are not liquid-tight. When such containers are to be used to transport liquid goods, these liquid goods need to be provided in a further container to ensure that the goods are stored securely. Such further container may then be placed into the intermodal container.

In each of the situations where a liner is to be positioned in a container to render it suitable for holding liquid goods, it is required that such liner will be so durable that defects occurring as a result of the transportation unit being subjected to transportation conditions are minimised.

This is now achieved according to the invention by a container liner for holding liquid goods, wherein the liner comprises a film comprising one or more layers, wherein at least one of said layers is a layer L1 comprising
 (a) ≥20.0 wt %, preferably ≥20.0 and ≤80.0 wt %, with regard to the total weight of that layer L1, of a polyethylene P1 having:
  a density of >900 and <915 kg/m³, preferably of >905 and <913 kg/m³ as determined in accordance with ASTM D1505 (2010);
  a melt mass flow rate of ≥0.1 and ≤5.0 g/10 min, preferably of ≥0.5 and ≤2.0 g/10 min, as determined in accordance with ISO 1133-1 (2011) at 190° C. using a load of 2.16 kg;
 and
 (b) ≥20.0 wt %, preferably ≥20.0 and ≤80.0 wt %, with regard to the total weight of that layer L1, of a polyethylene plastomer P2 having:
  a density of >880 and <905 kg/m³, preferably of >890 and <904 kg/m³ as determined in accordance with ASTM D1505 (2010);
  a melt mass flow rate of ≥0.1 and ≤5.0 g/10 min, preferably of ≥0.5 and ≤2.0 g/10 min, as determined in accordance with ISO 1133-1 (2011) at 190° C. using a load of 2.16 kg.

Such container liner demonstrates a desirably high flex resistance, combined with a high dart impact resistance, and a high tensile strength.

In the context of the present invention, the flex crack resistance of the liner may be determined by subjecting samples of the liner, for example samples of the film comprised in the liner, to a test in accordance with ASTM F392-93 (2004), which may also be referred to as a Gelbo flex test. In this test, the samples are subjected to a pre-defined number of flexural cycles, upon which the number of pinholes in the film is determined, as prescribed by ASTM F392-93 (2004). The less pinholes identified, the higher the flex crack resistance.

The dart impact resistance may be determined as the impact failure weight by subjecting samples of the liner, for example samples of the film comprised in the liner, to a test in accordance with ASTM D1709 (2009), method A.

In a particular embodiment, the invention relates to a container liner wherein the polyethylene plastomer P2 has:
 a fraction of material that is eluted in analytical temperature rising elution fractionation (a-TREF) at a temperature ≤30.0° C. of ≥5.0 wt %, preferably ≥10.0 wt %, with regard to the total weight of the polyethylene;
 a shear storage modulus G' determined at a shear loss modulus G"=5000 Pa of >1000 Pa, G' and G" being determined in accordance with ISO 6721-10 (2015) at 190° C.; and/or
 a chemical composition distribution broadness (CCDB) of ≥15.0, preferably ≥20.0,
wherein the CCDB is determined according to formula I:

$$CCDB = \frac{T_{z+2} - T_{n-2}}{T_{n-2}} * 100 \qquad \text{formula I}$$

wherein
$T_{n-2}$ is the moment calculated according to the formula II:

$$T_{n-2} = \frac{\sum \frac{w(i)}{T(i)^2}}{\sum \frac{w(i)}{T(i)^3}} \qquad \text{formula II}$$

and
$T_{z+2}$ is the moment calculated according to the formula III:

$$T_{z+2} = \frac{\sum w(i) \cdot T(i)^4}{\sum w(i) \cdot T(i)^3} \qquad \text{formula III}$$

wherein w(i) is the sampled weight fraction in wt % with regard to the total sample weight in a-TREF analysis of a sample (i) taken at temperature T(i), where T(i)>30° C., the area under the a-TREF curve being normalised to surface area=1 for T(i)>30° C.; and T(i) is the temperature at which sample (i) is taken in a-TREF analysis, in ° C.

In the context of the present invention, the melt mass flow rate is determined in accordance with ISO 1133-1 (2011), at 190° C., and expressed in g/10 min. The melt mass flow rate may be determined using a load of 2.16 kg, then referred to as MFR2, or using a load of 5.0 kg, then referred to as MFR5.

In the context of the present invention, the density of the polymer materials is determined in accordance with ASTM D1505 (2010), and expressed in kg/m$^3$.

For determination of the shear storage modulus G' and the shear loss modulus G", specimens may be used as prepared in accordance with ISO 17855-2 (2016). The DMS measurements were carried out according to ISO 6721-10 (2015) at 190° C. Determination of G' at G"=5000 Pa may be done by preparation of a double-logarithmic Cole-Cole plot of G' and G", where above and below G"=5000 Pa, each 2 data points are to be selected, so in total 4 data points, and a first order line may be determined, where from this line G' at G"=5000 Pa is determined.

According to the invention, analytical temperature rising elution fractionation, also referred to as a-TREF, may be carried out using a Polymer Char Crystaf-TREF 300 equipped with stainless steel columns having a length of 15 cm and an internal diameter of 7.8 mm, with a solution containing 4 mg/ml of sample prepared in 1,2-dichlorobenzene stabilised with 1 g/l Topanol CA (1,1,3-tri(3-tert-butyl-4-hydroxy-6-methylphenyl)butane) and 1 g/l Irgafos 168 (tri(2,4-di-tert-butylphenyl) phosphite) at a temperature of 150° C. for 1 hour. The solution may be further stabilised for 45 minutes at 95° C. under continuous stirring at 200 rpm before analyses. For analyses, the solution was crystallised from 95° C. to 30° C. using a cooling rate of 0.1° C./min. Elution may be performed with a heating rate of 1° C./min from 30° C. to 140° C. The set-up may be cleaned at 150° C. The sample injection volume may be 300 µl, and the pump flow rate during elution 0.5 ml/min. The volume between the column and the detector may be 313 µl. The fraction that is eluted at a temperature of ≤30.0° C. may in the context of the present invention be calculated by subtracting the sum of the fraction eluted >30.0° C. from 100%, thus the total of the fraction eluted≤30.0° C., and the fraction eluted >30.0° C. to add up to 100.0 wt %.

Particularly, a-TREF may be carried out using a Polymer Char Crystaf-TREF 300 using a solution containing 4 mg/ml of the polymer in 1,2-dichlorobenzene, wherein the solution is stabilised with 1 g/l 1,1,3-tri(3-tert-butyl-4-hydroxy-6-methylphenyl)butane and 1 g/l tri(2,4-di-tert-butylphenyl) phosphite) at a temperature of 150° C. for 1 hour, and further stabilised for 45 minutes at 95° C. under continuous stirring at 200 rpm, wherein the prior to analyses the solution is crystallised from 95° C. to 30° C. using a cooling rate of 0.1° C./min, and elution is performed at a heating rate of 1° C./min from 30° C. to 140° C., and wherein the equipment has been cleaned at 150° C.

In certain embodiments, the invention also relates to a container liner wherein the film comprises at least three layers A/B/C or consists of three layers A/B/C, wherein the layer A is in direct contact with the layer B, and the layer B is in direct contact with the layer C, preferably wherein the composition of the layer A is the same as the composition of the layer C. For example, at least the layer B may be a layer L1, preferably the layer B may be a layer L1.

The film may for example comprise ≥2.5 wt %, more preferably ≥2.5 and ≤10.0 wt %, of a high-density polyethylene having a density of >945 and <965 kg/m$^3$, as determined in accordance with ASTM D1505 (2010), preferably wherein the high-density polyethylene is a bimodal high density polyethylene. For example, the layer L1 may comprise a fraction of a high-density polyethylene, preferably having a density of >945 and <965 kg/m$^3$. Preferably, the layer L1 comprises ≥2.5 and ≤15.0 wt %, or ≥5.0 and ≤12.5 wt %, of a high-density polyethylene, preferably wherein the high-density polyethylene has a density of >945 and <965 kg/m$^3$, more preferably >950 and <960 kg/m$^3$. The high-density polyethylene may for example have an MFR2 of >0.01 and <5.0 g/10 min, preferably >0.1 and <2.0 g/10 min. The high-density polyethylene may have an MFR5 of >1.0 and <25.0 g/10 min, preferably >5.0 and <15.0 g/10 min.

The high-density polyethylene may for example be a homopolymer of ethylene. Alternatively, the high-density polyethylene may be a copolymer of ethylene and a comonomer selected from 1-butene, 1-hexene and 4-methyl-1-pentene. For example, the high-density polyethylene may be a copolymer comprising moieties derived from ethylene and ≥0.1 and ≤5.0 wt %, preferably ≥0.2 and ≤4.0 wt %, more preferably ≥0.5 and ≤3.0 wt %, of moieties derived from a comonomer selected from 1-butene, 1-hexene and 4-methyl-1-pentene, with regard to the total weight of the high-density polyethylene. For example, the high-density polyethylene may be a copolymer comprising ≥90.0, preferably ≥95.0, more preferably ≥96.0, even more preferably ≥97.0 wt %, of moieties derived from ethylene, and ≥0.1 and ≤5.0 wt %, preferably ≥0.2 and ≤4.0 wt %, more preferably ≥0.5 and ≤3.0 wt %, of moieties derived from a comonomer selected from 1-butene, 1-hexene and 4-methyl-1-pentene, with regard to the total weight of the high-density polyethylene.

The high-density polyethylene may for example be produced in a gas-phase polymerisation process or in a slurry polymerisation process. The high-density polyethylene may for example be produced using a Ziegler-type catalyst or using a Phillips-type chromium-based catalyst.

The film may for example have a thickness of ≥100 µm, preferably ≥100 and ≤1000 µm.

The film may for example have a density of <912 kg/m$^3$, as determined in accordance with ASTM D1505 (2010), preferably of >900 and <912 kg/m$^3$.

In a certain embodiment, the container liner has such dimensions allowing to contain a liquid volume of between 1.0 and 30.0 m$^3$, preferably of between 1.0 and 5.0 m$^3$, or of between 10.0 and 30.0 m$^3$. Preferably, the container liner further comprises at least one closable opening for filling and/or evacuating the liner, preferably the liner comprises a closable opening for filling and evacuating the liner.

The present invention also relates to a transportation unit comprising a container liner according to the invention, particularly wherein the container liner comprises a volume of liquid goods. Such liquid goods may for example be selected from potable liquids such as beverages, syrups, oils, fats, vinegars, and detergents. Alternatively, such liquid goods may be chemical compounds or formulations. Such transportation unit may for example be a box, preferably a cardboard box, or an intermodal container.

In a certain embodiment, the invention also relates to the use of a film comprising one or more layers, wherein at least one of said layers is a layer L1 comprising (a) ≥20.0 wt %, preferably ≥20.0 and ≤80.0 wt %, with regard to the total weight of that layer L1, of a polyethylene P1 having:
  a density of >900 and <915 kg/m$^3$, preferably of >905 and <913 kg/m$^3$ as determined in accordance with ASTM D1505 (2010);
  a melt mass flow rate of ≥0.1 and ≤5.0 g/10 min, preferably of ≥0.5 and ≤2.0 g/10 min, as determined in accordance with ISO 1133-1 (2011) at 190° C. using a load of 2.16 kg;
and
(b) ≥20.0 wt %, preferably ≥20.0 and ≤80.0 wt %, with regard to the total weight of that layer L1, of a polyethylene plastomer P2 having:
  a density of >880 and <905 kg/m$^3$, preferably of >890 and <904 kg/m$^3$ as determined in accordance with ASTM D1505 (2010);
  a melt mass flow rate of ≥0.1 and ≤5.0 g/10 min, preferably of ≥0.5 and ≤2.0 g/10 min, as determined in accordance with ISO 1133-1 (2011) at 190° C. using a load of 2.16 kg;
in a container liner for a transportation unit, wherein the container line has dimensions to allow it to contain a volume of liquids of between 1.0 and 30.0 m$^3$, for improvement of the flex resistance as determined in accordance with ASTM F392-93 (2004).

The polyethylene P1 may for example be a linear low-density polyethylene. Preferably, the polyethylene P1 is a copolymer of ethylene and 1-octene. For example, the polyethylene P1 may comprise ≥80.0 wt %, preferably ≥85.0 wt %, of moieties derived from ethylene, with regard to the total weight of the polyethylene. For example, polyethylene P1 may comprise ≥80.0 wt %, preferably ≥85.0 wt %, of moieties derived from ethylene, with regard to the total weight of the polyethylene, and moieties derived from 1-octene.

For example, the polyethylene P1 may comprise moieties derived from ethylene and <20.0 wt %, preferably <15.0 wt %, of moieties derived from 1-octene, with regard to the total weight of the polyethylene. For example, the polyethylene P1 may comprise moieties derived from ethylene and >0.0 and <20.0 wt %, preferably >0.0 and <15.0 wt %, of moieties derived from 1-octene. For example, the polyethylene P1 may comprise moieties derived from ethylene and >5.0 and <20.0 wt %, preferably >10.0 and <20.0 wt %, more preferably >10.0 and <15.0 wt %, of moieties derived from 1-octene, with regard to the total weight of the polyethylene.

In a certain embodiment, the invention relates to a container liner for holding liquid goods, wherein the liner comprises a film comprising one or more layers, wherein at least one of said layers is a layer L1 comprising
(c) ≥20.0 wt %, preferably ≥20.0 and ≤80.0 wt %, with regard to the total weight of that layer L1, of a polyethylene P1 having:
  a density of >900 and <915 kg/m$^3$, preferably of >905 and <913 kg/m$^3$ as determined in accordance with ASTM D1505 (2010);
  a melt mass flow rate of ≥0.1 and ≤5.0 g/10 min, preferably of ≥0.5 and ≤2.0 g/10 min, as determined in accordance with ISO 1133-1 (2011) at 190° C. using a load of 2.16 kg;
and
(d) ≥20.0 wt %, preferably ≥20.0 and ≤80.0 wt %, with regard to the total weight of that layer L1, of a polyethylene plastomer P2 having:
  a density of >880 and <905 kg/m$^3$, preferably of >890 and <904 kg/m$^3$ as determined in accordance with ASTM D1505 (2010);
  a melt mass flow rate of ≥0.1 and ≤5.0 g/10 min, preferably of ≥0.5 and ≤2.0 g/10 min, as determined in accordance with ISO 1133-1 (2011) at 190° C. using a load of 2.16 kg;
wherein the polyethylene P1 comprises moieties derived from ethylene and >5.0 and <20.0 wt %, preferably >10.0 and <15.0 wt %, of moieties derived from 1-octene, with regard to the total weight of the polyethylene P1.

The polyethylene P1 may have a number average molecular weight ($M_n$) of ≥25.0, preferably ≥30.0 kg/mol, for example ≥25.0 and ≤45.0, preferably ≥30.0 and ≤40.0 kg/mol. For example, the polyethylene P1 may have a weight average molecular weight ($M_w$) of ≥70.0 kg/mol, preferably ≥85.0 kg/mol, preferably ≥70.0 and ≤125.0, more preferably ≥85.0 and ≤115 kg/mol. For example, the polyethylene P1 may have a z-average molecular weight ($M_z$) of ≤500, preferably ≤400 kg/mol, for example ≥150 and ≤500 kg/mol, preferably ≥200 and ≤400 kg/mol. The polyethylene P1 may for example have an $M_w/M_n$ ratio of ≥2.0 and ≤4.0, preferably ≥2.5 and ≤3.5. The polyethylene P1 may for example have an $M_z/M_n$ ratio of ≤25.0, preferably ≤20.0, for example ≥5.0 and ≤25.0, preferably ≥5.0 and ≤20.0, more preferably ≥5.0 and ≤15.0. Herein $M_n$ is the number average molecular weight, $M_w$ the weight average molecular weight, and $M_z$ the z-average molecular weight, as determined in accordance with ASTM D6474 (2012).

The polyethylene P1 may for example be produced in a gas-phase polymerisation process, a slurry polymerisation process, or a solution polymerisation process. For example, the polyethylene P1 may for example be produced in a gas-phase polymerisation process, a slurry polymerisation process, or a solution polymerisation process, in the presence of a single-site type catalyst. In particular, the polyethylene P1 may for example be produced in a gas-phase polymerisation process, a slurry polymerisation process, or a solution polymerisation process, in the presence of a metallocene-type catalyst. For example, the polyethylene P1 may be produced in a gas-phase polymerisation process in the presence of a single-site type catalyst, preferably a metallocene-type catalyst. For example, the polyethylene P1 may be produced in a slurry polymerisation process in the presence of a single-site type catalyst, preferably a metallocene-type catalyst. For example, the polyethylene P1 may be produced in a solution polymerisation process in the presence of a single-site type catalyst, preferably a metallocene-type catalyst.

The polyethylene P1 may be produced in a polymerisation process comprising a single polymerisation reactor, or alternatively in a polymerisation process comprising multiple reactors positioned in series. For example, the polyethylene P1 may be produced in a polymerisation process comprising two or three reactors positioned in series, such as two reactors positioned in series. Where the polymerisation process involves use of multiple reactors, the reaction product from a preceding reactor is introduced into a subsequently positioned reactor, together with further monomers. The further monomers may be ethylene and/or 1-octene. For example, the polyethylene P1 may be produced in a solution polymerisation process comprising two or three reactors positioned in series.

The polyethylene plastomer P2 may for example have a fraction of material that is eluted in a-TREF at a temperature of ≤30.0° C. of ≥5.0 wt % with regard to the total weight of the polyethylene, preferably ≥7.5 wt %, more preferably ≥10.0 wt %, even more preferably ≥11.5 wt %. Preferably, polyethylene plastomer P2 has a fraction of material that is eluted in a TREF at a temperature of ≤30.0° C. of ≥5.0 wt % and ≤25.0 wt %, more preferably ≥7.5 wt % and ≤20.0 wt %, even more preferably ≥10.0 wt % and ≤20.0 wt %, even more preferably ≥11.0 wt % and ≤15.0 wt %, with regard to the total weight of the polyethylene.

The polyethylene plastomer P2 may for example have a shear storage modulus G' determined at a shear loss modulus G"=5000 Pa of >1000 Pa, preferably >1100 Pa, more preferably >1200 Pa, even more preferably >1300 Pa.

The polyethylene plastomer P2 may for example have a CCDB of ≥15.0, preferably ≥17.5, more preferably ≥20.0. For example, the polyethylene plastomer P2 may have a CCDB of ≥15.0 and ≤30.0, preferably ≥17.5 and ≤25.0, more preferably ≥20.0 and ≤25.0.

It is preferred that the polyethylene plastomer P2 comprises ≥70.0 wt % of moieties derived from ethylene, with regard to the total weight of the polyethylene plastomer, preferably ≥75.0 wt %, more preferably ≥80.0 wt %. Preferably, the polyethylene plastomer P2 comprises ≥70.0 and ≤98.0 wt %, more preferably ≥75.0 and ≤95.0 wt %, even more preferably ≥80.0 and ≤90.0 wt % of moieties derived from ethylene, with regard to the total weight of the polyethylene plastomer.

It is further preferred that the polyethylene plastomer P2 comprises ≤30.0 wt % of moieties derived from an α-olefin comprising 4-10 carbon atoms, with regard to the total weight of the polyethylene plastomer, preferably ≤25.0 wt %, more preferably ≤20.0 wt %. The polyethylene plastomer may for example comprise ≥5.0 wt % of moieties derived from an α-olefin comprising 4-10 carbon atoms, with regard to the total weight of the polyethylene plastomer, preferably ≥10.0 wt %, more preferably ≥15.0 wt %. For example, the polyethylene plastomer may comprise ≥5.0 and ≤30.0 wt % of moieties derived from an α-olefin comprising 4-10 carbon atoms, with regard to the total weight of the polyethylene plastomer, preferably ≥10.0 wt % and ≤25.0 wt %, more preferably ≥15.0 and ≤20.0 wt %.

The α-olefin may comprising 4-10 carbon atoms for example be selected from 1 butene, 1-hexene, 4-methyl-1-pentene, and 1-octene, such as from 1-butene, 1-hexene and 1-octene. For example, the α-olefin comprising 4-10 carbon atoms may be selected from 1-hexene and 1-octene. The moieties derived from an α-olefin comprising 4-10 carbon atoms may for example be moieties derived from 1-butene, 1-hexene, 4-methyl-1-pentene, 1-octene, or combinations thereof, preferably from 1-hexene or 1-octene, most preferably 1-octene.

The polyethylene plastomer P2 may for example comprise ≤30.0 wt % of moieties derived from an α-olefin comprising 4-10 carbon atoms, with regard to the total weight of the polyethylene plastomer, preferably ≤25.0 wt %, more preferably ≤20.0 wt %, wherein the α-olefin comprising 4-10 carbon atoms is selected from 1-butene, 1-hexene, 4-methyl-1-pentene, and 1-octene, such as from 1-butene, 1-hexene and 1-octene. The polyethylene plastomer may for example comprise ≥5.0 wt % of moieties derived from an α-olefin comprising 4-10 carbon atoms, with regard to the total weight of the polyethylene plastomer, preferably ≥10.0 wt %, more preferably ≥15.0 wt %, wherein the α-olefin comprising 4-10 carbon atoms is selected from 1-butene, 1-hexene, 4-methyl-1-pentene, and 1-octene, such as from 1-butene, 1-hexene and 1-octene. For example, the polyethylene plastomer may comprise ≥5.0 and ≤30.0 wt % of moieties derived from an α-olefin comprising 4-10 carbon atoms, with regard to the total weight of the polyethylene plastomer, preferably ≥10.0 wt % and ≤25.0 wt %, more preferably ≥15.0 and ≤20.0 wt %, wherein the α-olefin comprising 4-10 carbon atoms is selected from 1-butene, 1-hexene, 4-methyl-1-pentene, and 1-octene, such as from 1-butene, 1-hexene and 1-octene.

The polyethylene plastomer P2 may for example be produced via a solution polymerisation process, preferably by polymerisation of ethylene with 1-hexene and/or 1-octene. The polyethylene plastomer may for example be produced using a metallocene-type catalyst, preferably by polymerisation of ethylene with 1-hexene and/or 1-octene.

In certain of its embodiments, the film as comprised in the container liner of the invention may comprise a fraction of low-density polyethylene. For example, the film may comprise ≥2.5 and ≤15.0 wt % of the low-density polyethylene, with regard to the total weight of the film. For example, the layer L1 may comprise ≥2.5 and ≤15.0 wt % of a low-density polyethylene. It is preferred that the low-density polyethylene has a density of >900 and <935 kg/m$^3$, more preferably >910 and <930 kg/m$^3$, even more preferably >915 and <925 kg/m$^3$. Further preferably, the low-density polyethylene is a polyethylene produced via free-radical polymerisation of a reaction mixture comprising ethylene, preferably consisting of ethylene as the sole reactant. For example, the low-density polyethylene may be a homopolymer. The low-density polyethylene may be produced using a high-pressure polymerisation process, such as using a high-pressure tubular polymerisation process or using a high-pressure autoclave polymerisation process, preferably wherein the pressure in the polymerisation reactor is >150 MPa, such as >150 and <300 MPa, more preferably >200 and <300 MPa.

It is preferred that the low-density polyethylene has an a melt mass flow rate of ≥0.1 and ≤5.0 g/10 min, preferably of ≥0.5 and ≤2.0 g/10 min, as determined in accordance with ISO 1133-1 (2011) at 190° C. using a load of 2.16 kg.

In a certain of its embodiments, the invention relates to a container liner wherein the layer L1 comprises ≥2.5 and ≤15.0 wt % of a low-density polyethylene, preferably wherein the low-density polyethylene has a density of >900 and <935 kg/m$^3$, preferably wherein the low-density polyethylene is a polyethylene produced via free-radical polymerisation of a reaction mixture comprising ethylene, wherein preferably the low-density polyethylene has an a melt mass flow rate of ≥0.1 and ≤5.0 g/10 min, preferably of ≥0.5 and ≤2.0 g/10 min, as determined in accordance with ISO 1133-1 (2011) at 190° C. using a load of 2.16 kg.

In a certain embodiment, the film as comprised in the container liner comprises at least three layers A/B/C or consists of three layers A/B/C, wherein the layer A is in direct contact with the layer B, and the layer B is in direct contact with the layer C, wherein:
  the layer A comprises ≥75.0 wt %, preferably ≥80.0 wt %, more preferably ≥85.0 wt %, of the polyethylene P1, with regard to the total weight of the layer A;
  the layer B is a layer L1; and
  the layer C comprises ≥75.0 wt %, preferably ≥80.0 wt %, more preferably ≥85.0 wt %, of the polyethylene P1, with regard to the total weight of the layer C.

Preferably, the film as comprised in the container liner comprises at least three layers A/B/C or consists of three layers A/B/C, wherein the layer A is in direct contact with the layer B, and the layer B is in direct contact with the layer C, wherein:
  the layer A comprises ≥75.0 wt %, preferably ≥80.0 wt %, more preferably ≥85.0 wt %, of the polyethylene P1 and/or <25.0 wt %, preferably <20.0 wt %, more preferably <15.0 wt %, of the low-density polyethylene, with regard to the total weight of the layer A;

the layer B is a layer L1; and the layer C comprises ≥75.0 wt %, preferably ≥80.0 wt %, more preferably ≥85.0 wt %, of the polyethylene P1 and/or <25.0 wt %, preferably <20.0 wt %, more preferably <15.0 wt %, of the low-density polyethylene, with regard to the total weight of the layer C.

Further preferably, the film as comprised in the container liner comprises at least three layers A/B/C or consists of three layers A/B/C, wherein the layer A is in direct contact with the layer B, and the layer B is in direct contact with the layer C, wherein:

the layer A comprises ≥75.0 wt %, preferably ≥80.0 wt %, more preferably ≥85.0 wt %, of the polyethylene P1 and/or <25.0 wt %, preferably <20.0 wt %, more preferably <15.0 wt %, of the low-density polyethylene, with regard to the total weight of the layer A;

the layer B is a layer L1 comprising ≥20.0 and ≤80.0 wt % of the polyethylene P1, ≥20.0 and ≤80.0 wt % of the polyethylene plastomer P2, and ≥2.5 and ≤15.0 wt %, or ≥5.0 and ≤12.5 wt %, of the high-density polyethylene or of the low-density polyethylene; and the layer C comprises ≥75.0 wt %, preferably ≥80.0 wt %, more preferably ≥85.0 wt %, of the polyethylene P1 and/or <25.0 wt %, preferably <20.0 wt %, more preferably <15.0 wt %, of the low-density polyethylene, with regard to the total weight of the layer C.

Even further preferably, the film as comprised in the container liner comprises at least three layers A/B/C or consists of three layers A/B/C, wherein the layer A is in direct contact with the layer B, and the layer B is in direct contact with the layer C, wherein:

the layer A comprises ≥75.0 wt % and ≤95.0 wt %, preferably ≥80.0 wt % and ≤95.0 wt %, more preferably ≥85.0 wt % and ≤95.0 wt %, of the polyethylene P1 and/or >5.0 and <25.0 wt %, preferably >5.0 and <20.0 wt %, more preferably >5.0 and <15.0 wt %, of the low-density polyethylene, with regard to the total weight of the layer A;

the layer B is a layer L1 comprising ≥20.0 and ≤80.0 wt % of the polyethylene P1, ≥20.0 and ≤80.0 wt % of the polyethylene plastomer P2, and ≥2.5 and ≤15.0 wt %, or ≥5.0 and ≤12.5 wt %, of the high-density polyethylene or of the low-density polyethylene; and the layer C comprises ≥75.0 wt % and ≤95.0 wt %, preferably ≥80.0 wt % and ≤95.0 wt %, more preferably ≥85.0 wt % and ≤95.0 wt %, of the polyethylene P1 and/or >5.0 and <25.0 wt %, preferably >5.0 and <20.0 wt %, more preferably >5.0 and <15.0 wt %, of the low-density polyethylene, with regard to the total weight of the layer C.

In a yet further embodiment of the invention, the film as comprised in the container liner may comprise at least three layers A/B/C or may consist of three layers A/B/C, wherein the layer A is in direct contact with the layer B, and the layer B is in direct contact with the layer C, wherein:

the layer A comprises ≥75.0 wt % and ≤95.0 wt %, preferably ≥80.0 wt % and ≤95.0 wt %, more preferably ≥85.0 wt % and ≤95.0 wt %, of the polyethylene P1 and/or >5.0 and <25.0 wt %, preferably >5.0 and <20.0 wt %, more preferably >5.0 and <15.0 wt %, of the low-density polyethylene, with regard to the total weight of the layer A;

the layer B is a layer L1 comprising ≥20.0 and ≤80.0 wt % of the polyethylene P1, ≥20.0 and ≤80.0 wt % of the polyethylene plastomer P2, and ≥2.5 and ≤15.0 wt %, or ≥5.0 and ≤12.5 wt %, of the high-density polyethylene or of the low-density polyethylene; and the layer C comprises ≥75.0 wt % and ≤95.0 wt %, preferably ≥80.0 wt % and ≤95.0 wt %, more preferably ≥85.0 wt % and ≤95.0 wt %, of the polyethylene P1 and/or >5.0 and <25.0 wt %, preferably >5.0 and <20.0 wt %, more preferably >5.0 and <15.0 wt %, of the low-density polyethylene, with regard to the total weight of the layer C;

wherein the composition of the layer A is the same as the composition of the layer C.

For example, the layer A may have a thickness of ≥10.0 and ≤50.0 μm, preferably ≥20.0 and ≤40.0 μm. For example, the layer C may have a thickness of ≥10.0 and ≤50.0 μm, preferably ≥20.0 and ≤40.0 μm. For example, the layer B may have a thickness of ≥25.0 and ≤75.0 μm, preferably ≥40.0 and ≤60.0 μm. For example, the layer A may have a thickness of ≥10.0 and ≤50.0 μm, preferably ≥20.0 and ≤40.0 μm, the layer C may have a thickness of ≥10.0 and ≤50.0 μm, preferably ≥20.0 and ≤40.0 μm, and the layer B may have a thickness of ≥25.0 and ≤75.0 μm, preferably ≥40.0 and ≤60.0 μm.

For example, the film as comprised in the container liner may have a thickness of ≥100 and ≤1000 μm, preferably ≥100 and ≤300 μm, wherein the layer A constitutes ≥20.0 and ≤40.0 wt % and/or the layer B constitutes ≥20.0 wt % and <60.0 wt %, and/or the layer C constitutes ≥20.0 and ≤40.0 wt %, each with regard to the total weight of the film.

The invention will now be illustrated by the following non-limiting examples.

A number of multilayer films for use in container liners were produced using the materials as listed in the table below.

Materials

| | |
|---|---|
| LLDPE1 | Dow Elite 5401G, a linear low-density ethylene/1-octene polyethylene copolymer having and MFR2 of 1.0 g/10 min and a density of 918 kg/m$^3$ |
| LLDPE2 | SABIC Supeer 8112L, a linear low-density ethylene/1-octene polyethylene copolymer produced via solution polymerisation using a metallocene catalyst, having an MFR2 of 1.0 g/10 min, and a density of 912 kg/m$^3$ |
| LLDPE3 | Dow Elite AT6101 |
| LLDPE4 | Dow Elite 5400G, a linear low-density ethylene/1-octene polyethylene copolymer having and MFR2 of 1.0 g/10 min and a density of 916 kg/m$^3$ |
| LLDPE5 | SABIC Supeer 8112, a linear low-density ethylene/1-octene polyethylene copolymer produced via solution polymerisation using a metallocene catalyst, having an MFR2 of 1.0 g/10 min, and a density of 912 kg/m$^3$ |
| LDPE | SABIC LDPE 2100N0, a low-density polyethylene having an MFR2 of 0.33 g/10 min and a density of 921 kg/m$^3$ |
| POP1 | Dow Affinity PL 1880G, an ethylene/1-octene plastomer produced using a metallocene catalyst, having an MFR2 of 1.0 g/10 min, and a density of 902 kg/m$^3$ |

-continued

| | |
|---|---|
| POP2 | SABIC Cohere 8185, a polyethylene plastomer produced via solution polymerisation using a metallocene catalyst, having an MFR2 of 1.0 g/10 min, and a density of 885 kg/m$^3$ |
| POP3 | SABIC Cohere S100, a polyethylene plastomer produced via solution polymerisation using a metallocene catalyst, having an MFR2 of 1.0 g/10 min, and a density of 900 kg/m$^3$ |
| HDPE | SABIC HDPE FI1157, a high-density polyethylene having a density of 957 kg/m$^3$, an MFR2 of 11 g/10 min, and an MFR5 of 0.35 g/10 min. |

Further selected properties of the above materials are listed in the table below.

| | LLDPE5 | POP1 | POP3 |
|---|---|---|---|
| a-TREF <30 | 0.9 | 3.9 | 10.8 |
| a-TREF 30-94 | 99.1 | 96.0 | 89.2 |
| a-TREF >94 | 0 | 0.1 | 0 |
| CCDB | 8.6 | 19.1 | 20.8 |
| G' at G" = 5000 Pa (Pa) | | 1883 | 1372 | a-TREF<30 indicates the fraction of the polymer that is eluted in a-TREF according to the method presented above in the temperature range ≤30.0° C., expressed in wt %, and represents the amorphous fraction of the polymer, calculated by subtracting the a-TREF 30-94 and the a-TREF>94 fraction from 100.0 wt %;

a-TREF 30-94 indicates the fraction of the polymer that is eluted in a-TREF in the temperature range of >30.0 and ≤94.0° C., expressed in wt %, and represents the branched fraction of the polymer;

a-TREF>94 indicates the fraction of the polymer that is eluted in a-TREF in the temperature range of >94.0 and <140° C., expressed in wt %, and represents the linear fraction of the polymer; and the CCDB is the chemical composition distribution broadness calculated according to the method described herein above.

Using the above materials, a number of three-layer films were produced via multi-layer blown film extrusion, wherein a first outer layer was provided for by a first extruder, a core layer was provided for by a second extruder, and a second outer layer was provided for by a third extruder. Each of the extruders supplied material to a circular die having a diameter of 60 mm and a die gap of 2.0 mm. Each extruder was a single-screw extruder having a screw diameter of 25 mm. The blow-up ratio was 2.5. The total output of the combined extruders was 8 kg/h, wherein the first extruder provided 30% thereof to form the first outer layer, the second extruder provided 40% to form the core layer, and the third extruder provided 30% to form the second outer layer.

The extruders were equipped with four barrel zones, and a die in which the layers were combined to form the multi-layer film. The temperature in the extruder zones was in each of the extruders as follows:

| | |
|---|---|
| Zone 1 (feed zone) | 170° C. |
| Zone 2 | 185° C. |
| Zone 3 | 190° C. |
| Zone 4 | 190° C. |
| Die | 190° C. |

According to the process as set out here above, films were produced having a thickness of 125 μm, according to the material formulations for each of the layers, and thus the feed compositions for each of the corresponding extruders, as presented here below.

| Example | First outer layer | Core layer | Second outer layer |
|---|---|---|---|
| 1 | 90% LLDPE1<br>10% LDPE | 60% POP1<br>30% LLDPE4<br>10% LDPE | 90% LLDPE1<br>10% LDPE |
| 2 | 90% LLDPE1<br>10% LDPE | 90% LLDPE3<br>10% LDPE | 90% LLDPE1<br>10% LDPE |
| 3 | 90% LLDPE2<br>10% LDPE | 30% POP2<br>60% LLDPE5<br>10% LDPE | 90% LLDPE2<br>10% LDPE |
| 4 | 90% LLDPE2<br>10% LDPE | 60% POP3<br>30% LLDPE5<br>10% LDPE | 90% LLDPE2<br>10% LDPE |
| 5 | 90% LLDPE2<br>10% LDPE | 30% POP2<br>60% LLDPE5<br>10% HDPE | 90% LLDPE2<br>10% LDPE |

In the above table, all percentages are to be understood as weight percentage of the particular material as part of the total weight of the material of that particular layer of each film.

The films as produced via the above procedure were subjected to testing of properties as presented in the table below.

| Example | 1 | 2 | 3 | 4 | 5 |
|---|---|---|---|---|---|
| Film density | 914 | 914 | 911 | 911 | 911 |
| Dart impact | 2312 | 2480 | 2252 | 2552 | 2420 |
| Tensile strength MD | 42 | 48 | 53 | 56 | 50 |
| Tensile strength TD | 47 | 47 | 53 | 54 | 45 |
| Modulus MD | 139 | 153 | 128 | 136 | 128 |
| Modulus TD | 170 | 141 | 131 | 130 | 124 |
| Puncture force | 71.3 | 71.0 | 88.0 | 89.6 | 93.2 |
| Puncture break | 2.8 | 2.7 | 4.9 | 4.7 | 5.2 |
| Pinhole count | 4 | 5.5 | 3 | 2 | 0.5 |

Wherein:

the film density is determined in accordance with ASTM D1505 (2010) and expressed in kg/m$^3$;

the Dart impact strength is determined as the impact failure weight in accordance with ASTM D1709 (2016), method A, and expressed in g;

the tensile properties tensile strength and modulus (1% secant modulus) were determined in accordance with ASTM D882 (2012), in the machine direction (MD) and transverse direction (TD) of the film sample;

puncture force is the maximum force as determined in accordance with ASTM D5748-95 (2012), expressed in N;

puncture break is the puncture energy to break as determined in accordance with ASTM D5748-95 (2012), expressed in J; and pinhole count is the number of pinholes occurring on a sample per 300 cm² after 10800 cycles when tested in accordance with ASTM F392-93 (2004).

From the above results, it can be observed that the film samples of the container liners as per the present invention, represented by examples 3-5, demonstrate a reduction in pinhole count, increased maximum puncture force, and increased puncture energy to break. This renders such container liners particularly suitable for holding liquid goods, as the chances of leakage of liquids occurring are significantly reduced.

The invention claimed is:

1. A container liner for holding liquid goods, wherein the liner comprises a film comprising one or more layers, wherein at least one of said layers is a layer L1 comprising
   (a) ≥20.0 wt % with regard to a total weight of that layer L1, of a polyethylene P1 having:
      a density of >900 and <915 kg/m³, as determined in accordance with ASTM D1505 (2010);
      a melt mass flow rate of ≥0.1 and ≤5.0 g/10 min, as determined in accordance with ISO 1133-1 (2011) at 190° C. using a load of 2.16 kg; and
   (b) ≥20.0 wt %, with regard to a total weight of that layer L1, of a polyethylene plastomer P2 having:
      a density of >880 and <905 kg/m³, as determined in accordance with ASTM D1505 (2010);
      a melt mass flow rate of ≥0.1 and ≤5.0 g/10 min, as determined in accordance with ISO 1133-1 (2011) at 190° C. using a load of 2.16 kg.

2. The container liner according to claim 1, wherein the polyethylene plastomer P2 has
   a fraction of material that is eluted in analytical temperature rising elution fractionation (a-TREF) at a temperature ≤30.0° C. of ≥5.0 wt %, with regard to the total weight of the polyethylene plastomer P2;
   a shear storage modulus G' determined at a shear loss modulus G"=5000 Pa of >1000 Pa, G' and G" being determined in accordance with ISO 6721-10 (2015) at 190° C.; and/or
   a chemical composition distribution broadness (CCDB) of ≥15.0, wherein the CCDB is determined according to formula I:

$$CCDB = \frac{T_{z+2} - T_{n-2}}{T_{n-2}} * 100 \quad \text{formula I}$$

wherein
$T_{n-2}$ is the moment calculated according to the formula II:

$$T_{n-2} = \frac{\sum \frac{w(i)}{T(i)^2}}{\sum \frac{w(i)}{T(i)^3}} \quad \text{formula II}$$

and
$T_{z+2}$ is the moment calculated according to the formula III:

$$T_{z+2} = \frac{\sum w(i) \cdot T(i)^4}{\sum w(i) \cdot T(i)^3} \quad \text{formula III}$$

wherein
w (i) is a sampled weight fraction in wt % with regard to a total sample weight in a-TREF analysis of a sample (i) taken at temperature T (i), where T(i) >30° C., the area under the a-TREF curve being normalised to surface area=1 for T(i)>30° C.; and
T(i) is the temperature at which the sample (i) is taken in a-TREF analysis, in ° C.

3. The container liner according to claim 1, wherein the film comprises at least three layers A/B/C, wherein the layer A is in direct contact with the layer B, and the layer B is in direct contact with the layer C.

4. The container liner according to claim 3, wherein at least the layer B is the layer L1.

5. The container liner according to claim 1, wherein the layer L1 comprises ≥2.5 and ≤15.0 wt % of a low-density polyethylene.

6. The container liner according to claim 1, wherein the film comprises ≥2.5 wt %, of a high-density polyethylene having a density of >945 and <965 kg/m³, as determined in accordance with ASTM D1505 (2010).

7. The container liner according to claim 1, wherein the film has a thickness of ≥100 μm.

8. The container liner according to claim 1 wherein the film has a density of <912 kg/m³, as determined in accordance with ASTM D1505 (2010).

9. The container liner according to claim 1, wherein the liner has such dimensions allowing to contain a liquid volume of between 1.0 and 30.0 m³.

10. The container liner according to claim 1, wherein the liner further comprises at least one closable opening for filling and/or evacuating the liner.

11. A transportation unit comprising a container liner according to claim 1.

12. The transportation unit according to claim 11, wherein the container liner comprises a volume of liquid goods.

13. The transportation unit according to claim 12 wherein the liquid goods are selected from beverages, syrups, oils, fats, vinegars, and detergents.

14. The transportation unit according to claim 11, wherein the transportation unit is a box.

15. The container liner of claim 1, wherein at least one of said layers is the layer L1 comprising
   (a) ≥20.0 and ≤80.0 wt %, with regard to a total weight of that layer L1, of the polyethylene P1 having:
      the density of >905 and <913 kg/m³, as determined in accordance with ASTM D1505 (2010);
      the melt mass flow rate of ≥0.5 and ≤2.0 g/10 min, as determined in accordance with ISO 1133-1 (2011) at 190° C. using a load of 2.16 kg; and
   (b) ≥20.0 and ≤80.0 wt %, with regard to the total weight of that layer L1, of the polyethylene plastomer P2 having:
      the density of >890 and <904 kg/m³, as determined in accordance with ASTM D1505 (2010);
      the melt mass flow rate of ≥0.5 and ≤2.0 g/10 min, as determined in accordance with ISO 1133-1 (2011) at 190° C. using a load of 2.16 kg.

16. The container liner according to claim 5, wherein the low-density polyethylene has a density of >900 and <935 kg/m³, and a melt mass flow rate of ≥0.5 and ≤2.0 g/10 min, as determined in accordance with ISO 1133-1 (2011) at 190° C. using a load of 2.16 kg.

* * * * *